April 30, 1929.  A. H. J. MÖLLERSTRÖM  1,711,120

DEVICE FOR THE PARING OR GRATING OF ROOT VEGETABLES

Filed May 27, 1927

AXEL HERBERT JULIUS MÖLLERSTRÖM
INVENTOR:
By *Otto Munk*
his Attorney.

Patented Apr. 30, 1929.

1,711,120

UNITED STATES PATENT OFFICE.

AXEL HERBERT JULIUS MÖLLERSTRÖM, OF STOCKHOLM, SWEDEN.

DEVICE FOR THE PARING OR GRATING OF ROOT VEGETABLES.

Application filed May 27, 1927, Serial No. 194,596, and in Sweden October 28, 1926.

This invention relates to a device in such apparatus for the paring of root vegetables, which consists of a container provided with a rotatable and detachable supporting disc. The device has for its objects an effective paring, as well as the separating and collecting of the pared particles and principally a convenient lifting out of the pared root vegetables and a particularly easy and effective cleaning of the apparatus.

Figure 1:
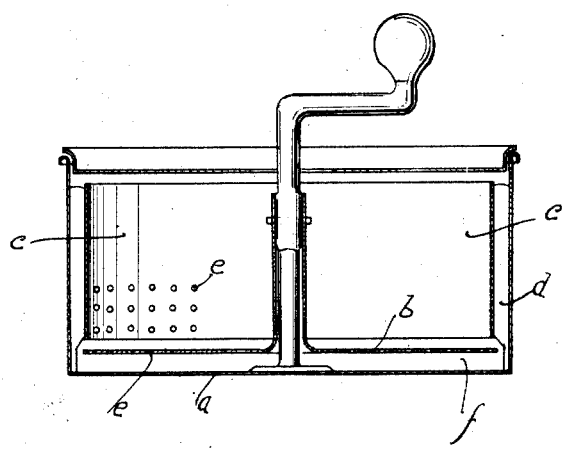

In the accompanying drawings one embodiment of the invention is shown. Fig. 1 is a vertical section and Fig. 2 a horizontal section through the device.

Figure 2:
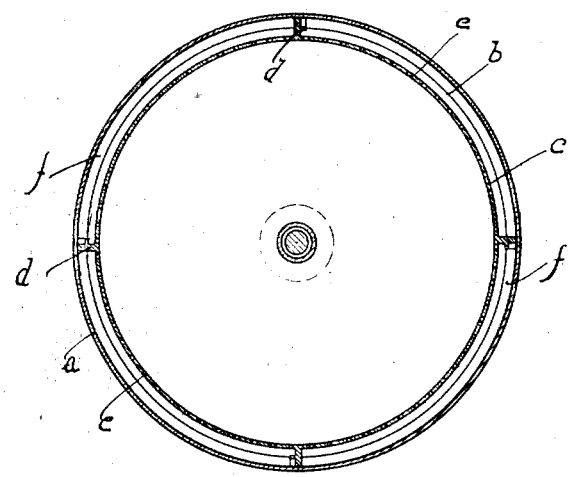

In Figs. 1 and 2 $a$ is the container and $b$ is the detachable and rotatable disc. In the container $a$ is placed a detachable ring $c$ provided with ribs $d$ and perforated like a grater, which perforations are indicated by $e$. The space between the insertion ring and the container is indicated by $f$. In Fig. 1 as well as Fig. 2 it is evident that by the operation of the crank or other means to lift the rotatable disc, the ring also necessarily follows, together with the rotatable disc $b$ forming a holder, by means of which the pared vegetables are easily lifted out of the container $a$, whereby the particles of rind formed by using the device remain in the container, and may easily be removed.

Having now described my invention, what I claim as new and desire to secure by Letters Patent is:

1. A device for paring root vegetables comprising an outer container enclosing partly a detachable ring receiving the root vegetables and having means for grating the root vegetables, partly a rotatable and detachable bottom disc separated from the said ring and by the rotation of which the root vegetables are forced into contact with the grating means of the ring, said rotatable bottom disc having a greater outer diameter than the ring and being located beneath the same in such a manner that it, when lifted, strikes the ring and carries the same with it, together with the pared root vegetables out of the container.

2. A device as claimed in claim 1, in which the ring is provided with projecting parts serving as supports for the ring and providing a space between the ring and the outer container.

In witness whereof, I have hereunto signed my name.

AXEL HERBERT JULIUS MÖLLERSTRÖM.